(12) United States Patent
Nadal

(10) Patent No.: US 9,669,500 B2
(45) Date of Patent: Jun. 6, 2017

(54) COOKING DEVICE FOR A SOLID-FUEL COOKER INCLUDING FUEL CONTAINER AND SOLID COVER AND RELATED METHODS

(71) Applicant: FIRE BUTLER, LLC, Beverly Hills, FL (US)

(72) Inventor: Vincent T. Nadal, Beverly Hills, FL (US)

(73) Assignee: FIRE BUTLER, LLC, Beverly Hills, FL (US)

( * ) Notice: Subject to any disclaimer, the term of this patent is extended or adjusted under 35 U.S.C. 154(b) by 402 days.

(21) Appl. No.: 14/587,248

(22) Filed: Dec. 31, 2014

(65) Prior Publication Data

US 2016/0183723 A1    Jun. 30, 2016

(51) Int. Cl.
*A47J 37/07*  (2006.01)
*B23P 19/00*  (2006.01)

(52) U.S. Cl.
CPC ........... *B23P 19/00* (2013.01); *A47J 37/0786* (2013.01)

(58) Field of Classification Search
CPC .... B23P 19/00; A47J 37/0786; A47J 37/0713; A47J 37/0704; A47J 37/0694; A47J 37/044; F24C 11/00; F24C 3/14; F24C 1/205; F24C 15/34; F24B 1/205; A01G 13/06; G07F 17/0078; A21B 3/155; A23B 7/144; F23Q 25/00; F23Q 2/163; F23D 11/04

See application file for complete search history.

(56) References Cited

U.S. PATENT DOCUMENTS

| | | |
|---|---|---|
| 1,042,273 A | 10/1912 | Roe |
| 1,447,029 A | 2/1923 | Manchester |
| 2,894,448 A | 7/1959 | Henderson et al. |
| 3,217,634 A | 11/1965 | Fox |
| 4,430,985 A | 2/1984 | Huneycutt |
| 4,592,334 A | 6/1986 | Logan, Jr. |
| 4,777,927 A | 10/1988 | Stephen et al. |
| 5,074,279 A | 12/1991 | Sainsbury |
| 5,687,704 A | 11/1997 | Lerch et al. |
| 5,797,386 A | 8/1998 | Orr |
| 6,213,006 B1 | 4/2001 | Reardon et al. |
| 6,688,301 B1 | 2/2004 | McNeill |
| 7,032,587 B2 | 4/2006 | McNeill |
| 2005/0039612 A1 | 2/2005 | Denny |
| 2006/0042475 A1 | 3/2006 | Craig |

OTHER PUBLICATIONS

Nadal, Vincent T., U.S. Appl. No. 29/516,736, filed Feb. 5, 2015.

*Primary Examiner* — Alfred Basichas
(74) *Attorney, Agent, or Firm* — Allen, Dyer, Doppelt, & Gilchrist, P.A.

(57) ABSTRACT

A cooking device may be for a solid-fuel cooker that includes a firebox, a cooking plate carried adjacent an open upper end of the firebox and defining a cooking surface, and a lid to be carried by a sidewall of the firebox over the cooking surface. The cooking device may include a fuel container for carrying the solid-fuel therein and to be carried within the firebox spaced inwardly from the sidewall. The fuel container may include a tubular lower body having opposing open ends and a lower body sidewall having a plurality of air openings therein, and a tapered upper body having a larger open end open toward and spaced below the cooking surface and a smaller open end coupled to an open end of the tubular lower body. A solid cover may be carried by the larger open end of the tapered upper body.

25 Claims, 11 Drawing Sheets

COOKING DEVICE FOR A SOLID-FUEL COOKER INCLUDING FUEL CONTAINER AND SOLID COVER AND RELATED METHODS

TECHNICAL FIELD

The present invention relates to the field of cooking, and, more particularly, to solid-fuel cookers and related methods.

BACKGROUND

A cooker, and more particularly, an outdoor cooker, for example a barbeque grill, is a relatively popular cooking device. A typical barbeque grill, for example, provides cooking heat from below where the food it to be cooked and is generally fueled from natural or propane gas or charcoal.

Different cooking techniques may be used to cook using a barbeque grill. For example, grilling often refers to using a barbeque grill where the food is cooked using a high heat from a low-smoke fuel (e.g., propane or natural gas) for a relatively short time and wherein a cooking flame directly contacts the food. Another cooking technique may be referred to as smoking, wherein the food is cooked at a relatively low temperature for a relatively long time over indirect heat generated from a relatively high-smoke fuel (e.g., charcoal). The cooking flame, if any, generally does not directly contact the food being cooked in the smoking technique.

Unlike a natural gas or propane gas based barbeque or cooker, regulating a cooking temperature within a solid fuel cooker, for example, a charcoal-based cooker may be relatively difficult. For example, with respect to a charcoal cooker, it may be particularly, difficult to achieve a relatively constant desired temperature for a relatively long duration as when using the smoking technique. A longer duration cooking time, for example greater than six (6) hours may be particularly desirable for cooking a larger amount of food, for example, a turkey or other large amount of meat using the smoking technique. Additionally, a longer duration cooking time may be desirable for slow-cooking, such as for example, brisket or pork.

Several charcoal-based cookers attempt to regulate temperate while sustaining charcoal burning, for example. One such cooker is disclosed in U.S. Pat. No. 4,430,985 to Huneycutt. The Huneycutt cooker discloses a thermostatically controlled charcoal cooker that is includes a heat sensitive spring coupled to a set of valve. The valves are opened and closed based upon heat sensed by the heat sensitive spring.

U.S. Pat. No. 6,688,301 to McNeil discloses a barbeque accessory to sustain charcoal burning. More particularly, the McNeil patent discloses a loop received into a heat chamber of a charcoal barbeque grill and that rests on a bottom edge of the charcoal barbeque grill. The loop has opening therein. Charcoal is positioned outside the loop.

To provide improved temperature regulation, for example, to retain moisture, several charcoal-based cookers use different materials rather than metal. For example, the Big Green Egg available from Big Green Egg, Inc. of Atlanta, Ga. uses a ceramic chamber to retain heat and maintain food moisture. However, such cookers are generally relatively expensive and often require the purchase of a new cooker to obtain the regulated temperature for long duration feature.

SUMMARY

A cooking device may be for a solid-fuel cooker that includes a firebox for carrying solid-fuel therein. The firebox has a base and at least one sidewall extending upwardly from the base. The solid-fuel cooker includes a cooking plate carried adjacent an open upper end of the firebox and defining a cooking surface and a lid to be carried by at least one sidewall over the cooking surface. The cooking device may include a fuel container for carrying the solid-fuel therein and to be carried within the firebox adjacent the base and spaced inwardly from the at least one sidewall. The fuel container may include a tubular lower body having opposing open ends and at least one lower body sidewall having a plurality of air openings therein. The fuel container may also include a tapered upper body having a larger open end open toward and spaced below the cooking surface and a smaller open end coupled to an upper one of the opposing open ends of the tubular lower body. The cooking device may further include a solid cover carried by the larger open end of the tapered upper body to define an air seal with the larger open end. Accordingly, the cooking device may provide increased duration and increased temperature control, for example, upwards of twenty-four (24) hours.

The fuel container may further include a cover lip extending from the larger open end of the tapered upper body, for example. The cooking device may further include a seal between the solid cover and the larger open end of the tapered upper body.

The solid-fuel cooker may further include a solid-fuel plate carried below the cooking surface. The fuel container may be carried by the solid-fuel plate, for example. The cooking device may include a plurality of legs extending from the tubular lower body and configured to space the fuel container above the solid-fuel plate.

The fuel container may include a collar having a plurality of spaced apart openings therein. The collar may be slideably positioned around the tubular lower body and configured to selectively cover at least a portion of the air openings, for example.

The tubular lower body may be a cylindrically shaped lower body, for example. The tapered upper body may be a frusto-conical shaped upper body.

The solid cover may include ceramic, for example. The solid cover may include metal, for example. The tapered upper body may have a plurality of temperature control openings therein adjacent the solid cover.

A method aspect is directed to a method of making cooking device for a solid-fuel cooker that includes a firebox for carrying solid fuel therein and having a base and at least one sidewall extending upwardly from the base, a cooking plate carried adjacent an open upper end of the firebox and defining a cooking surface, and a lid to be carried by the at least one sidewall over the cooking surface. The method may include forming a fuel container for carrying the solid-fuel therein, and to be carried within the firebox adjacent the base and spaced inwardly from the at least one sidewall. Forming the fuel container may include forming a tubular lower body having opposing open ends and at least one lower body sidewall having a plurality of air openings therein, and forming a tapered upper body having a larger open end open toward and spaced below the cooking surface and a smaller open end coupled to an upper one of the opposing open ends of the tubular lower body. The method also includes forming a solid cover to be carried by the larger open end of the tapered upper body to define an air seal with the larger open end.

DETAILED DESCRIPTION

Figure 1:
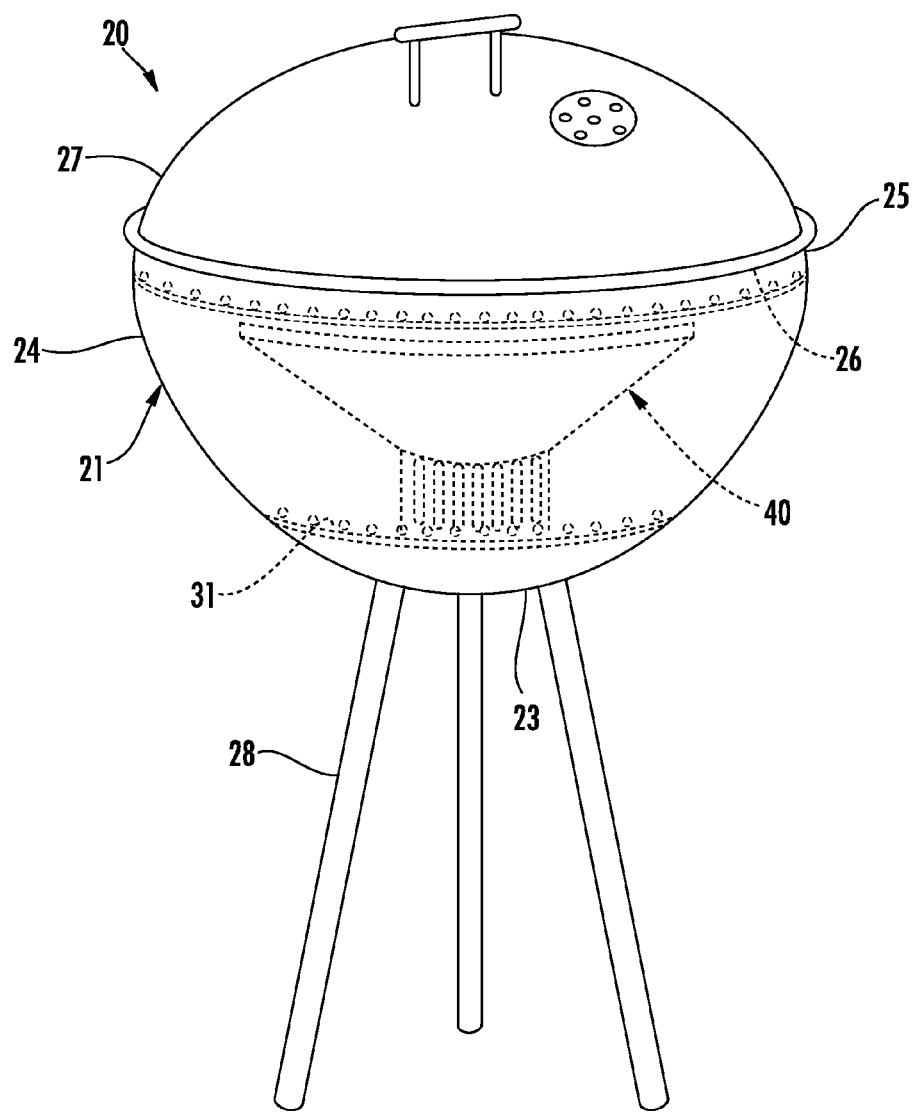
FIG. 1 is a perspective view of a solid-fuel cooker including a cooking device in accordance with an embodiment of the present invention.
Figure 2:
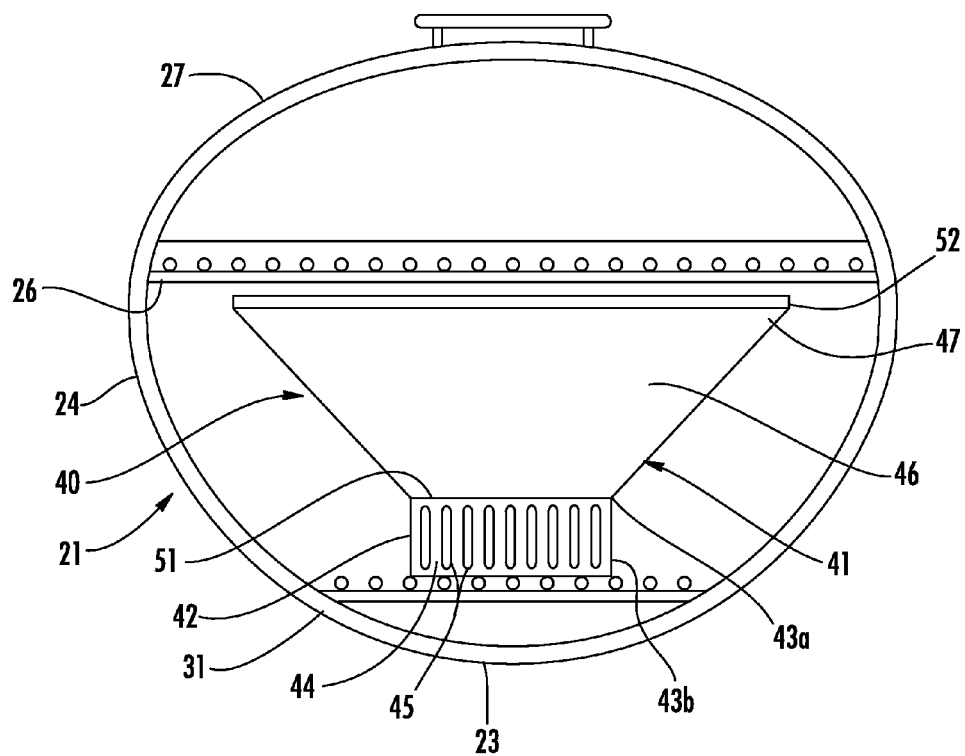
FIG. 2 is a side sectional view of a portion of the solid-fuel cooker of FIG. 1 including the cooking device.
Figure 3:
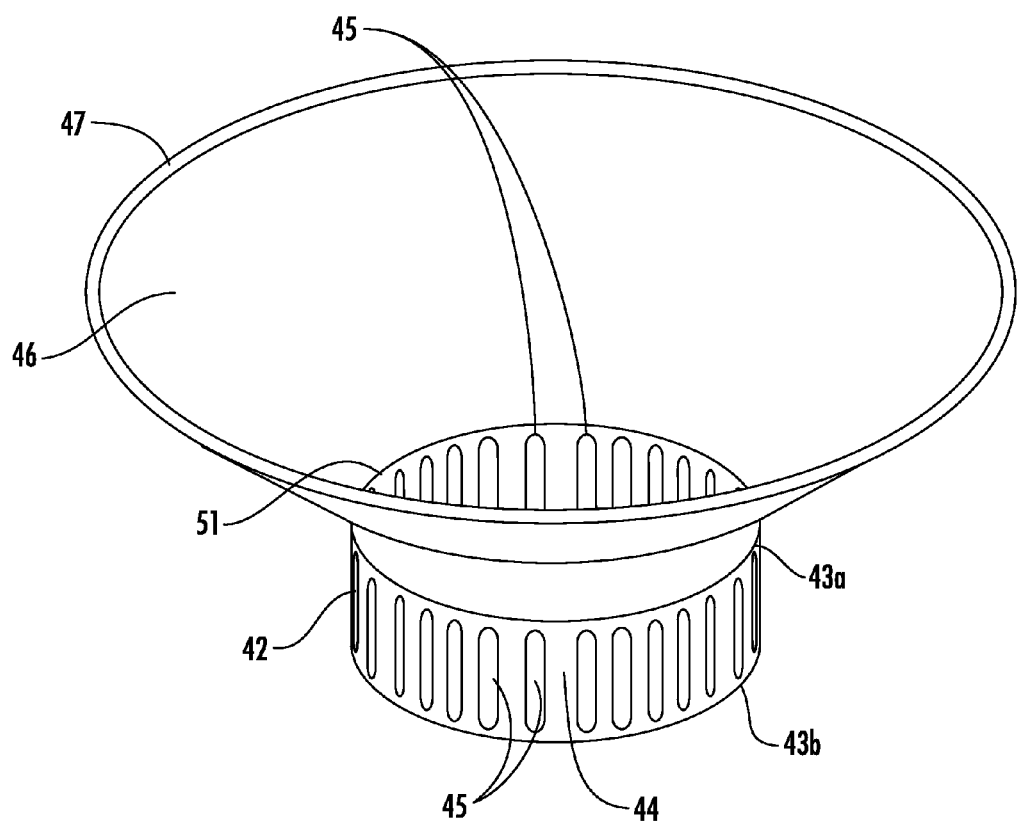
FIG. 3 is a perspective view of the cooking device of FIG. 2.
Figure 4:
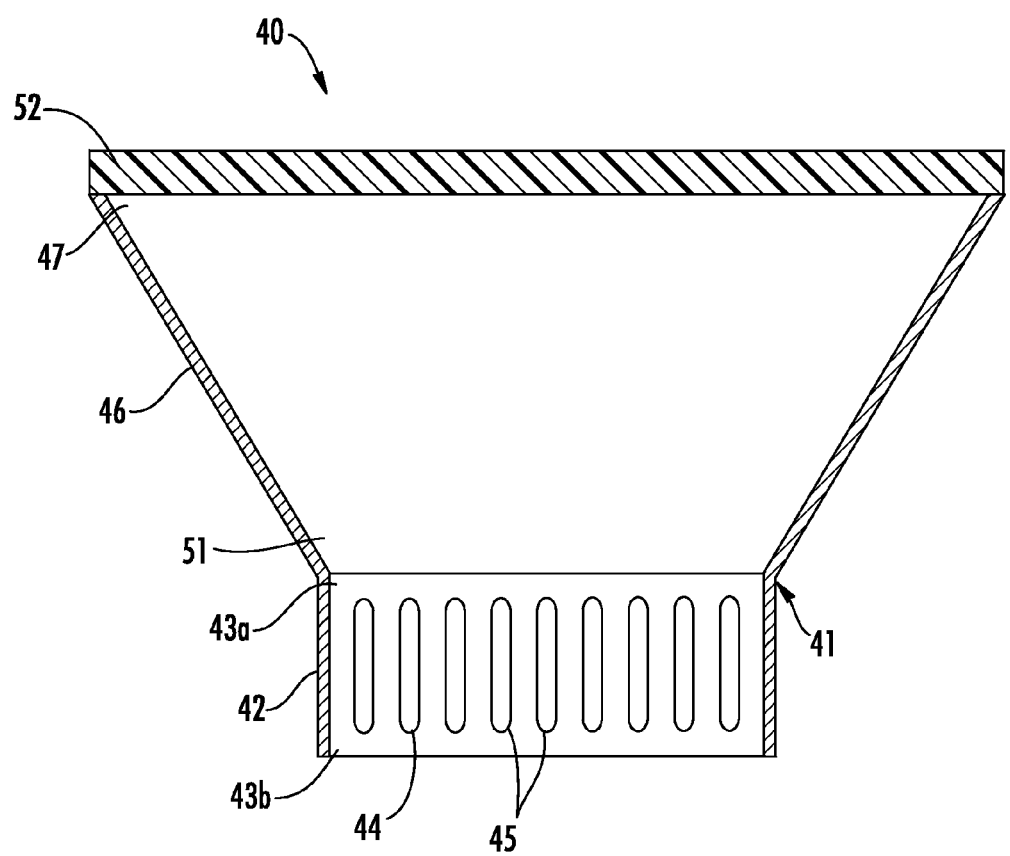
FIG. 4 is an enlarged cross-sectional view of the cooking device of FIG. 1.
Figure 5:
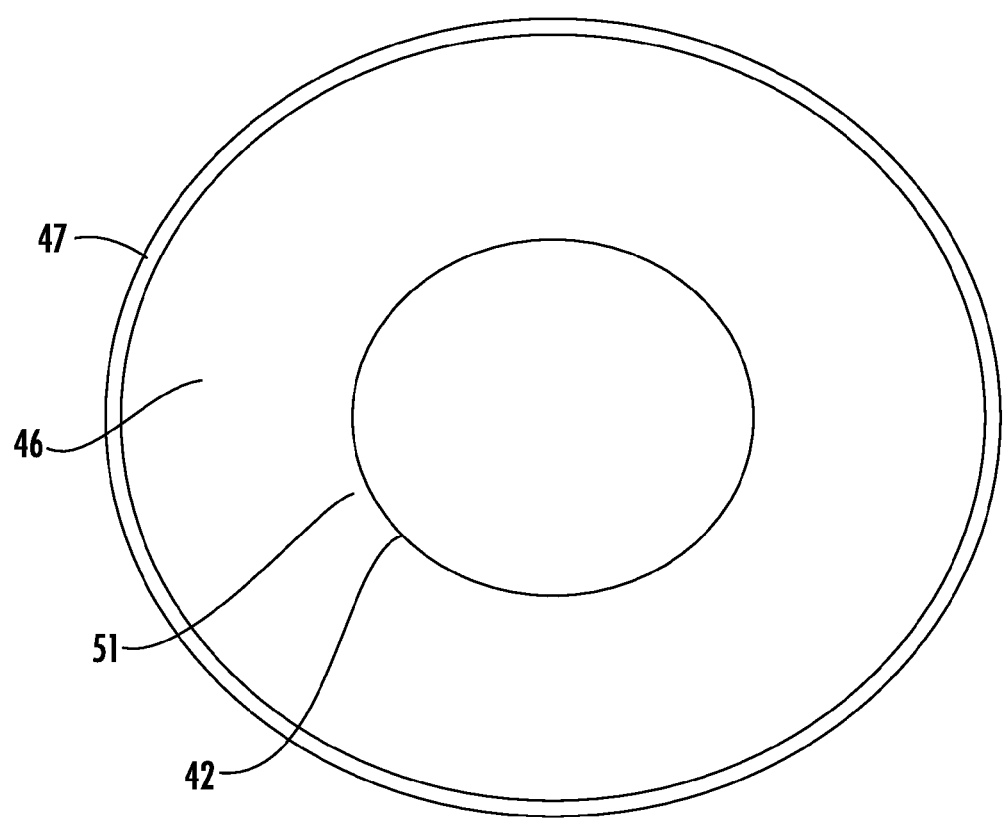
FIG. 5 is a top view of a portion of cooking device of FIG. 3 without the solid cover.
Figure 6:
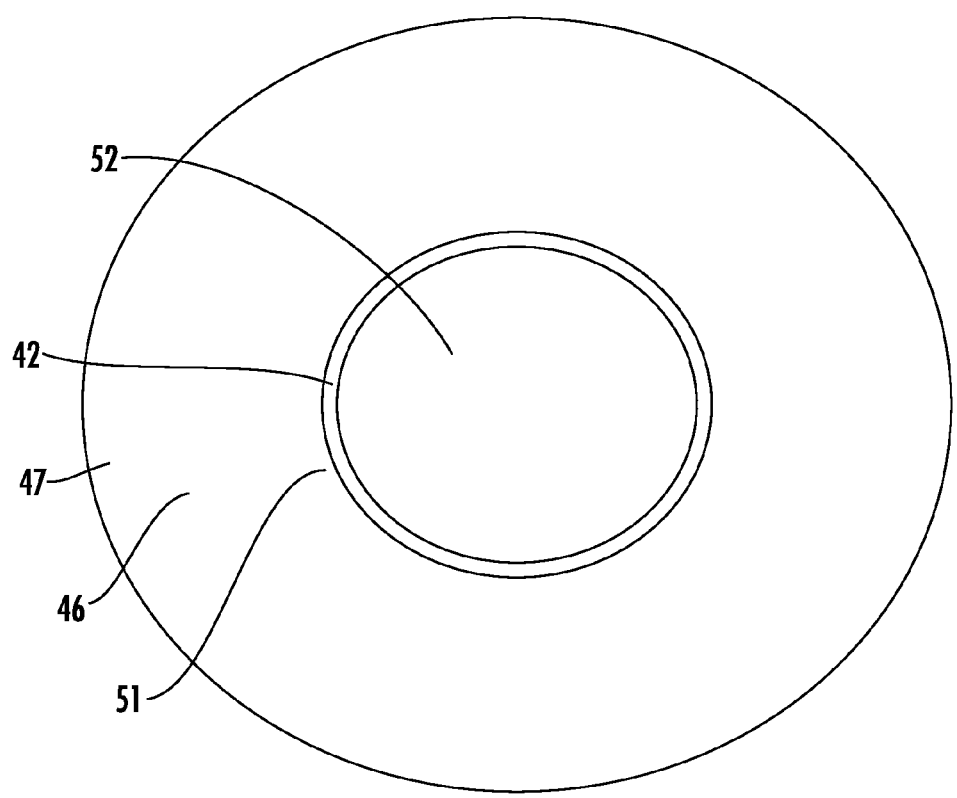
FIG. 6 is bottom view of the cooking device of FIG. 3.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime and multiple prime notation, and like numbers in increments of 100 are used to indicate like elements in different embodiments.

Referring initially to FIGS. 1-6, a cooking device 40 is for a solid-fuel cooker 20 that includes a firebox 21 for carrying solid-fuel therein. An exemplary solid-fuel may be charcoal, for example, in the form of charcoal briquettes. Of course, the solid-fuel may be another type of solid-fuel, as will be appreciated by those skilled in the art.

The firebox 21 illustratively has a base 23 a sidewall 24 extending upwardly from the base. The firebox 21 is illustratively round in shape, i.e., having one continuous sidewall, but it should be appreciated by those skilled in the art that the more than one sidewall may extend upwardly from the base, for example, to example, to define a rectangular shaped or other shaped firebox. The firebox 21 is illustratively supported by legs 28.

The solid-fuel cooker 20 also includes a cooking plate 26 carried adjacent an open upper end 25 of the firebox 21 and defining a cooking surface. In other words, food may be placed directly on the cooking plate 26 or cooking surface during operation of the solid-fuel cooker 20. The cooking plate 26 is illustratively a grate having a framework of parallel or crossed bars. The cooking plate 26 may be another type of cooking plate, for example, a griddle, and may not have opening therein.

The solid-fuel cooker 20 also includes a lid 27 that is carried by the sidewall 24 over the cooking surface or cooking plate 26. The lid 27 is removable to allow positioning and/or inspection of food during operation of the solid fuel cooker 20. The lid 27 is replaceable to cover the cooking surface to retain heat therewithin the solid fuel cooker 20.

The solid-fuel cooker 20 also illustratively includes a solid-fuel plate 31 carried below and spaced from the cooking plate 26. Where the solid-fuel is in the form of charcoal briquettes, the charcoal briquettes may be carried by the solid-fuel plate 31, as may typically be the case for a conventional solid fuel cooker. In some embodiments, the solid fuel plate 31 may not be included, and the solid-fuel may sit directly on the base 23.

The cooking device 40 includes a fuel container 41 for carrying the solid fuel therein. The cooking device 40 is carried within the firebox 21 adjacent the base 23 and spaced inwardly from the sidewall 24. In particular, the fuel container 41 may be carried by the solid-fuel plate 31, for example. In some embodiments, the solid-fuel plate 31 may have an opening or cut-out therein for receiving the fuel container 41 therein.

The fuel container 41 includes a tubular lower body 42 that has opposing open ends 43*a*, 43*b*. The fuel container 41 also includes lower body sidewall 44 that has air openings 45 therein. The tubular lower body 42 is illustratively cylindrical in shape and may be metallic, for example stainless steel. Of course, the tubular lower body 42 may be another shape, for example, rectangular and/or may be a different material. In embodiments where the solid-fuel plate 31 has an opening therein, the tubular lower body 42 is slideably received within the opening.

The air openings 45 are illustratively elongate openings and extend between the opposing open ends 43*a*, 43*b* in the lower body sidewall 44. The air openings 45 may be sized to be smaller than a charcoal briquette, for example, and may be sized to be 1.25 inches tall, ⅜ of an inch wide, and spaced apart from each other by ⅜ of an inch. In some embodiments, the lower body sidewall 44 may not have air openings, or the openings may be sized differently, for example, based upon a desired temperature, an overall size and shape of the solid-fuel cooker 20, and/or other factors, as will be appreciated by those skilled in the art.

The fuel container 41 also includes a tapered upper body 46. The tapered upper body 46 has a larger open end 47 open toward and spaced below the cooking surface or cooking plate 26 and a smaller open end 51 coupled to an upper one 43*a* of the opposing open ends of the tubular lower body 42. The tapered upper body 46 illustratively has a frusto-conical shape and may also be metallic, for example, stainless steel. Of course, the tapered upper body 46 may have another shape, for example, a horn shape, shape to match a rectangular shaped tubular lower body, or other shape. The tapered upper body 46 may also be a different material, which may be the same as the tubular lower body 42.

The cooking device 40 may further include a solid cover 52 carried by the larger open end 47 of the tapered upper body 46 to define an air seal with the larger open end. Unlike a cooking or solid-fuel grate, for example, that has openings therein, the solid cover 52 has no openings so that the entire enlarged upper open end 47 of the tapered upper body 46 is sealed. The solid cover 52 may have a surface area greater than half of a surface area of the cooking surface or grate 26.

The solid cover 52 may be ceramic, for example, as will be appreciated by those skilled in the art. The solid cover 52 may also be metal, for example, stainless steel. Of course the solid cover 52 may be other and/or additional materials, for example, that are suitable for high-heat. As will be appreciated by those skilled in the art, and as will be described in further detail below, the air seal allows oxygen to the solid-fuel to be limited to control is burning, and thus temperature.

During operation of the cooking device 40, a desired amount of solid-fuel is placed within the fuel container 41, for example, based upon a desired duration and temperature. For a longer duration, the solid-fuel generally will fill up to a top of the tapered upper body 46. The solid-fuel is ignited, for example, by externally igniting a handful amount of the solid-fuel and replacing it in the fuel container 41. The solid plate 52 is then positioned on the larger open upper end 47 of the tapered upper body 46 so that an air-tight seal is formed therebetween. Air is drawn into the firebox 21 through an air port in the firebox, typically in the base 23, for example. The drawn in air provides the oxygen to keep the solid-fuel burning. The solid-fuel adjacent the air openings 45 is burned as this is where the air is drawn into the fuel container 41.

Solid-fuel adjacent the tapered upper body 46, specifically, the larger open end 47 of the tapered body is not burned since there is generally no air available as it is being used adjacent the air openings 45. There is no air available adjacent the larger open end 47 of tapered upper body 46 because of the air seal defined by the solid cover 52 and the larger open upper end of the tapered upper body. In other words, should the solid cover 52 be removed during operation or burning of the solid-fuel, air would thus be supplied to the enlarged open end 47 of the tapered upper body 46 (e.g., where a majority of the unburned solid-fuel is contained) causing a large amount of the solid-fuel to ignite. Thus, removal of the solid cover 52 may be highly undesirable as this would cause highly increased temperatures and reduced duration. As the solid-fuel burns, the ashes thereof may be expelled through the air openings 45.

Figure 7:
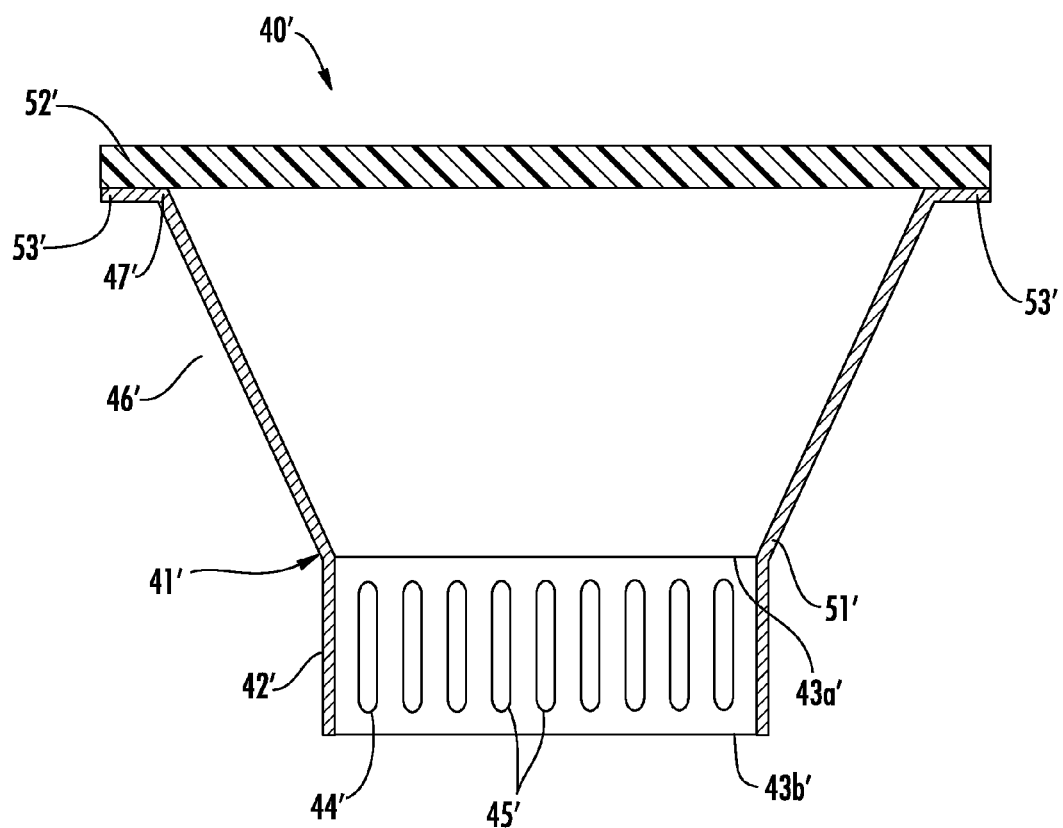
FIG. 7 is an enlarged cross-sectional view of a cooking device according to another embodiment of the present invention.

Referring now to FIG. 7, in an embodiment the fuel container 41' may include a cover lip 53' extending from the larger open end 47' of the tapered upper body 46'. Illustratively, the cover lip 53' extends outwardly, but in some embodiments may extend inwardly, or both inwardly and outwardly. The cover lip 53' may advantageously provide a larger surface area for sealing the cover 52' to the larger open end 47' of the tapered upper body 46'. The cover lip 53' may also provide a larger coupling area for a seal, for example as described below.

Figure 8:
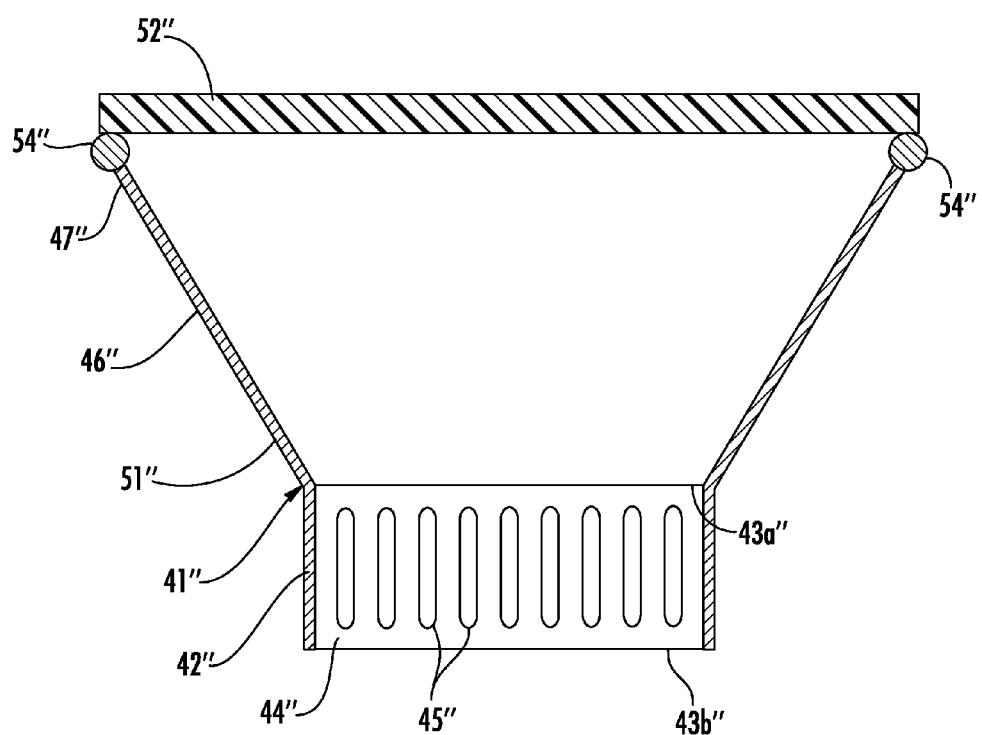
FIG. 8 is an enlarged cross-sectional view of a cooking device according to another embodiment of the present invention.

Referring now to FIG. 8, in another embodiment, the cooking device 40" may also include a seal 54" between the solid cover 52" and the larger open end 47" of the tapered upper body 46". The seal 54" may include graphite, for example. The seal 54" may also or additionally be a mesh or braided seal, for example, similar to the type found on many electric oven doors, as will be appreciated by those skilled in the art.

Figure 9:
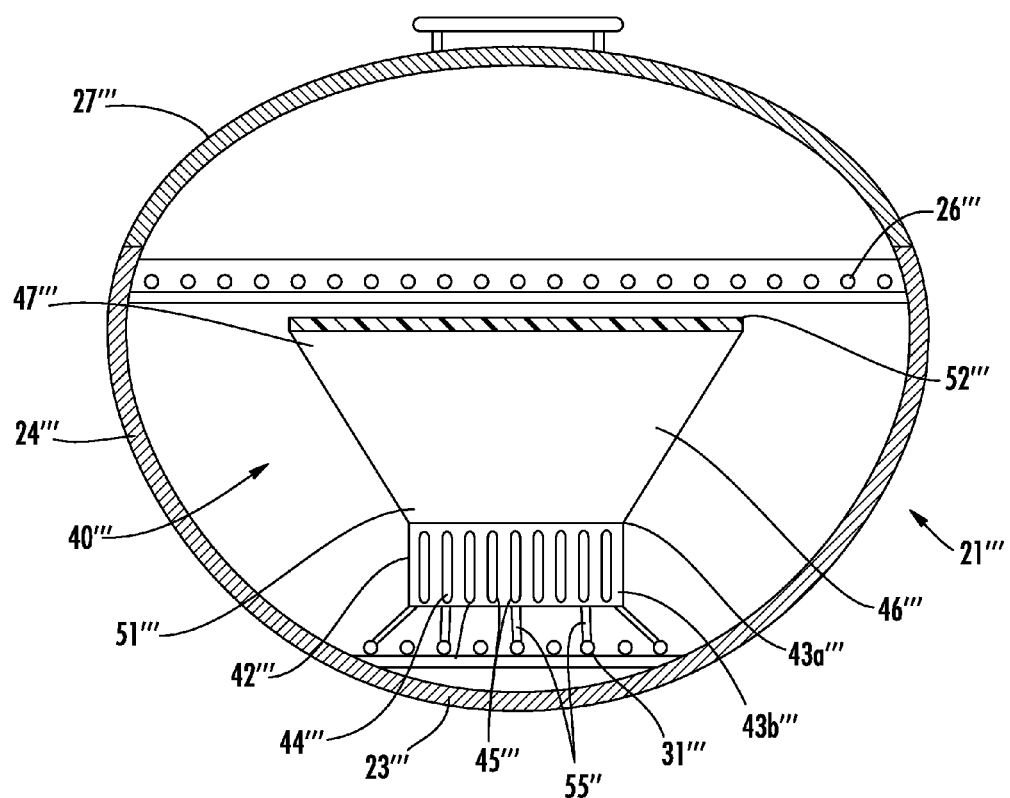
FIG. 9 is a side-sectional view of a solid-fuel cooker including a cooking device in accordance with another embodiment of the present invention.

Referring now to FIG. 9, in some embodiments, the cooking device 40''' may include legs 55''' that extend from the tubular lower body 42'''. The legs 55''' space the fuel container 41''' above the solid-fuel plate 31''' and closer to the cooking surface 26'''. The legs 55''' may be adjustable length legs, for example.

Figure 10:
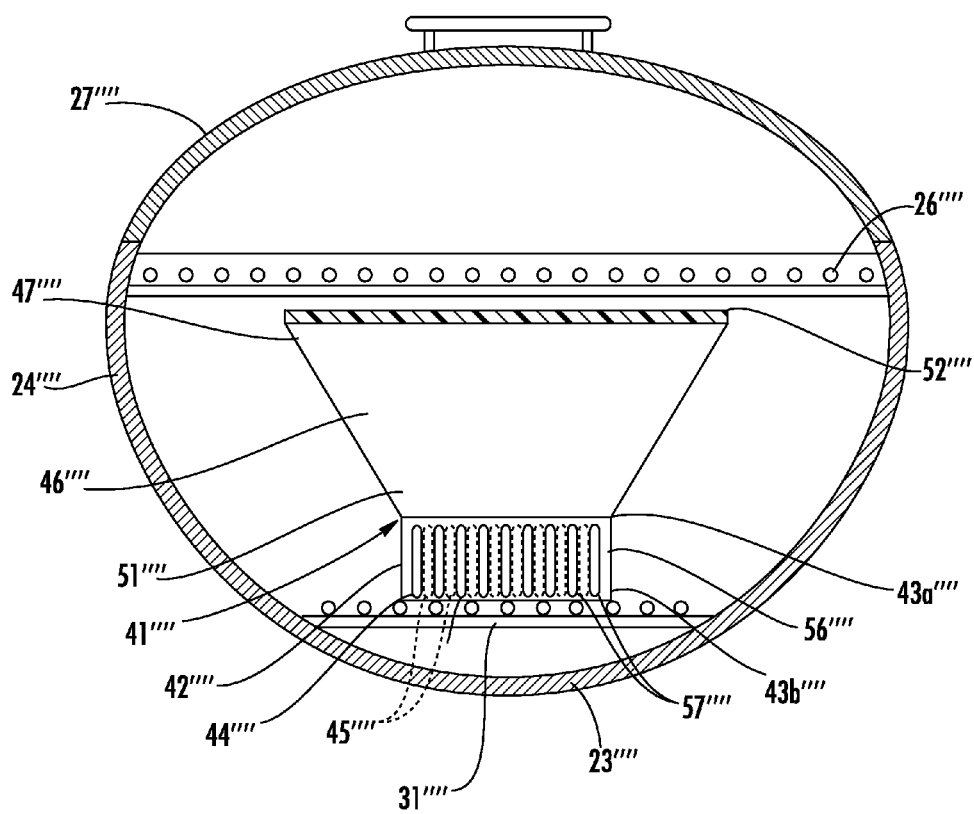
FIG. 10 is a side-sectional view of a solid-fuel cooker including a cooking device in accordance with another embodiment of the present invention.

Referring now to FIG. 10, in another embodiment, the fuel container 41"" may include a collar 56"" having a plurality of spaced apart air control openings 57"" therein. The collar 56"" may be slideably positioned around the tubular lower body 42"" and may be rotated or configured to selectively cover at least a portion of the air openings 45"". For example, the collar 56"", which may be considered a damper, may be positioned to fully close the air openings 45"" by misaligning the air openings and the air control openings 57"". In contrast, the collar 56"" may be positioned to fully open the air openings 57"" by aligning the air openings and the air control openings. The collar 56"" may be configured to a partial alignment between the air openings 45"" and the air control openings 57"", for example, for further temperature and duration control as will be appreciated by those skilled in the art. The collar 56"" may be the same material as the tubular lower body 42"", for example, stainless steel. The collar 56"" may be another material.

Figure 11:
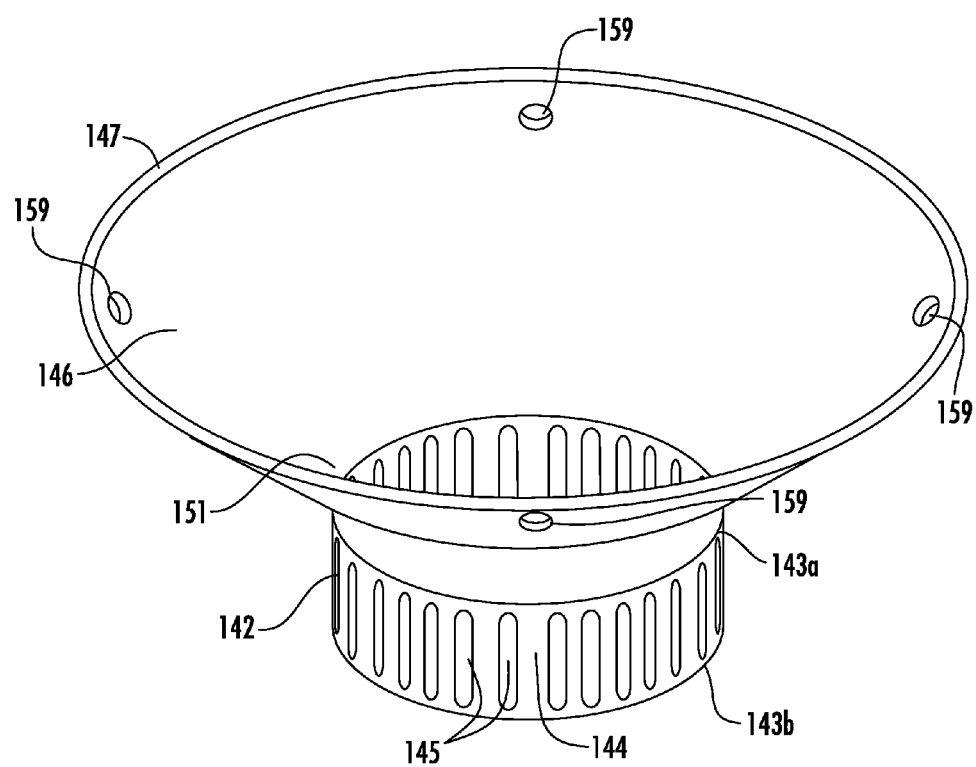
FIG. 11 is a perspective view of a cooking device in accordance with another embodiment of the present invention.

Referring now to FIG. 11, in another embodiment, temperature control openings 159 in the tapered upper body 146 adjacent the larger open upper end 147. More particularly, the temperature control openings 159 may be spaced below the solid cover 152, for example, an inch. Each temperature control opening 159 is about one inch in diameter and spaced equidistant around the tapered upper body 149. Illustratively, there are four temperature control openings 159, but it should be appreciated that there may be a different number of temperature control openings 159. As will be appreciated by those skilled in the art, the temperature control openings 159 allow a relatively small amount of air to enter the solid-fuel container 140. The entering air is pulled toward the solid-fuel when burning, thus creating a draft of air. The draft provides more oxygen to the burning solid-fuel, and thus the temperature increases, but the duration of burning of the solid-fuel is relatively unchanged.

It should be understood that there may any number of temperature control openings 159 having any size, however, too many temperature control openings has the same effect as cooking without the solid cover 152, which is undesirable. As described above, without the solid cover 152, the solid-fuel will burn at an undesirably high temperature and for an undesirably short time.

Moreover, in some embodiments, a the temperature control openings 159 may be include a damper to permit selective opening and closing (partial and/or full) of each of the temperature control openings. For example, the damper may be in the form of a removable plug having an opening therein smaller than the temperature control opening (i.e., to make the temperature control opening smaller), or the removable plug may fully close the respective temperature control opening. In other embodiments, the damper may operate similar to the collar described above with respect to FIG. 10 so that the size of the temperature control opening varies based upon rotation or sliding the damper, as will be appreciated by those skilled in the art.

As will be appreciated by those skilled in the art, the cooking device 40 may be particularly advantageous as it may be retrofitted or added (i.e., as an aftermarket part) to nearly any solid-fuel cooker at a relatively low cost. Thus, there may be no need to buy a new solid-fuel cooker to achieve relatively long cooking duration and with a relatively stable or maintained temperature, as a new solid-fuel cooker is relatively expensive. For example, the cooking device may provide or maintain temperatures in a range of 190° F. to 275° F. for at least seven (7) hours, and more particularly, fourteen (14) hours. However, the duration may be based upon the type of solid-fuel. For example, lump charcoal may burn quicker than briquettes by about 20%.

A method aspect is directed to a method of making cooking device 40 for a solid fuel cooker 20 that includes a firebox 21 for carrying solid-fuel therein and having a base 23 and at least one sidewall 24 extending upwardly from the base, a cooking plate 26 carried adjacent an open upper end 25 of the firebox and defining a cooking surface, and a lid 27 to be carried by the at least one sidewall over the cooking surface. The method includes forming a fuel container 41 for carrying the solid-fuel therein, and to be carried within the firebox 21 adjacent the base 23 and spaced inwardly from the at least one sidewall 24. Forming the fuel container 41 includes forming a tubular lower body 42 having opposing open ends 43a, 43b and at least one lower body sidewall 44 having a plurality of air openings 45 therein, and forming a tapered upper body 46 having a larger open end 47 open toward and spaced below the cooking surface 26 and a smaller open end 51 coupled to an upper one of the opposing open ends 43a of the tubular lower body. The method also includes forming a solid cover 52 to be carried by the larger open end 47 of the tapered upper body 46 to define an air seal with the larger open end.

While exemplary dimensions and shapes of the cooking device 40 have been described herein, it will be appreciated that the cooking device may be sized and shaped to achieve desired results and to fit in nearly any sized solid-fuel cooker. Many modifications and other embodiments of the invention will also come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A cooking device for a solid fuel cooker comprising a firebox for carrying solid-fuel therein and having a base and at least one sidewall extending upwardly from the base, a cooking plate carried adjacent an open upper end of the firebox and defining a cooking surface, and a lid to be carried by the at least one sidewall over the cooking surface, the cooking device comprising:
   a fuel container for carrying the solid-fuel therein, and to be carried within the firebox adjacent the base and spaced inwardly from the at least one sidewall, the fuel container comprising
      a tubular lower body having opposing open ends and at least one lower body sidewall having a plurality of air openings therein, and
      a tapered upper body having a larger open end open toward and spaced below the cooking surface and a smaller open end coupled to an upper one of the opposing open ends of said tubular lower body; and
   a solid cover carried by the larger open end of said tapered upper body to define an air seal with the larger open end.

2. The cooking device of claim 1, wherein said fuel container further comprises a cover lip extending from the larger open end of said tapered upper body.

3. The cooking device of claim 1, further comprising a seal between said solid cover and the larger open end of said tapered upper body.

4. The cooking device of claim 1, wherein the solid-fuel cooker further comprises a solid-fuel plate carried below the cooking surface; and wherein said fuel container is carried by the solid-fuel plate.

5. The cooking device of claim 4, further comprising a plurality of legs extending from said tubular lower body and configured to space said fuel container above said solid-fuel plate.

6. The cooking device of claim 1, wherein said fuel container comprises a collar having a plurality of spaced apart openings therein, said collar slideably positioned around said tubular lower body and configured to selectively cover at least a portion of the air openings.

7. The cooking device of claim 1, wherein said tubular lower body comprises a cylindrically shaped lower body.

8. The cooking device of claim 1, wherein said tapered upper body comprises a frusto-conical shaped upper body.

9. The cooking device of claim 1, wherein said solid cover comprises ceramic.

10. The cooking device of claim 1, wherein said solid cover comprises metal.

11. The cooking device of claim 1, wherein said tapered upper body has a plurality of temperature control openings therein adjacent the solid cover.

12. A solid fuel cooker comprising:
   a firebox for carrying solid-fuel therein and having a base and at least one sidewall extending upwardly from the base;
   a cooking plate carried adjacent an open upper end of the firebox and defining a cooking surface;
   a lid to be carried by the at least one sidewall over the cooking surface; and
   a cooking device comprising
      a fuel container for carrying the solid-fuel therein, and to be carried within the firebox adjacent the base and spaced inwardly from the at least one sidewall, the fuel container comprising
         a tubular lower body having opposing open ends and at least one lower body sidewall having a plurality of air openings therein, and
         a tapered upper body having a larger open end open toward and spaced below the cooking surface and a smaller open end coupled to an upper one of the opposing open ends of said tubular lower body; and
      a solid cover carried by the larger open end of said tapered upper body to define an air seal with the larger open end.

13. The solid-fuel cooker of claim 12, wherein said fuel container further comprises a cover lip extending from the larger open end of said tapered upper body.

14. The solid-fuel cooker of claim 12, wherein said cooking device further comprises a seal between said solid cover and the larger open end of said tapered upper body.

15. The solid-fuel cooker of claim 12, further comprising a solid-fuel plate carried below the cooking surface; and wherein said fuel container is carried by the solid-fuel plate.

16. The solid-fuel cooker of claim 12, wherein said tubular lower body comprises a cylindrically shaped lower body.

17. The solid-fuel cooker of claim 12, wherein said tapered upper body comprises a frusto-conical shaped upper body.

18. The solid-fuel cooker of claim 12, wherein said solid cover comprises ceramic.

19. The solid-fuel cooker of claim 12, wherein said tapered upper body has a plurality of temperature control openings therein adjacent the solid cover.

20. A method of making cooking device for a solid-fuel cooker comprising a firebox for carrying solid-fuel therein and having a base and at least one sidewall extending upwardly from the base, a cooking plate carried adjacent an open upper end of the firebox and defining a cooking surface, and a lid to be carried by the at least one sidewall over the cooking surface, the method comprising:
   forming a fuel container for carrying the solid-fuel therein, and to be carried within the firebox adjacent the base and spaced inwardly from the at least one sidewall, forming the fuel container comprising forming a tubular lower body having opposing open ends and at least one lower body sidewall having a plurality of air openings therein, and forming a tapered upper body having a larger open end open toward and spaced below the cooking surface and a smaller open end coupled to an upper one of the opposing open ends of the tubular lower body; and forming a solid cover to be carried by the larger open end of the tapered upper body to define an air seal with the larger open end.

21. The method of claim 20, wherein forming fuel container further comprises forming a cover lip extending from the larger open end of the tapered upper body.

22. The method of claim 20, further comprising positioning a seal between the solid cover and the larger open end of the tapered upper body.

23. The method of claim 20, wherein the forming fuel container further comprises forming a collar having a plurality of spaced apart openings therein, the collar being slideably positioned around the tubular lower body to selectively cover at least a portion of the air openings.

24. The method of claim 20, wherein forming the tubular lower body comprises forming a cylindrically shaped lower body.

25. The method of claim 20, wherein forming the tapered upper body comprises forming a frusto-conical shaped upper body.

* * * * *